United States Patent [19]

Neumann

[11] Patent Number: 4,991,491

[45] Date of Patent: Feb. 12, 1991

[54] CIRCUIT ARRANGEMENT FOR POSITION AND FEED CONTROL OF A HYDRAULIC CYLINDER

[75] Inventor: Joachim Neumann, Lohr/Main, Fed. Rep. of Germany

[73] Assignee: Mannesmann Rexroth GmbH, Lahr, Fed. Rep. of Germany

[21] Appl. No.: 344,469

[22] Filed: Apr. 27, 1989

Related U.S. Application Data

[63] Continuation of Ser. No. 131,906, Dec. 11, 1987, abandoned.

[30] Foreign Application Priority Data

Dec. 13, 1986 [DE] Fed. Rep. of Germany ....... 3642642

[51] Int. Cl.[5] .............................................. F15B 13/16
[52] U.S. Cl. ........................................ 91/361; 91/459; 137/625.25
[58] Field of Search ..................... 91/358 R, 361, 362, 91/275, 459; 137/625.25; 318/609, 610, 611

[56] References Cited

U.S. PATENT DOCUMENTS

| | | | |
|---|---|---|---|
| 3,821,625 | 6/1974 | Scholl | 91/361 X |
| 3,874,407 | 4/1975 | Griswold | 91/459 X |
| 4,184,333 | 1/1980 | Blaha et al. | 91/532 X |
| 4,336,745 | 6/1982 | Lund | 91/361 X |
| 4,358,989 | 11/1982 | Tordenmalm | 91/361 |
| 4,466,337 | 8/1984 | Eiler | 137/625.65 X |
| 4,520,919 | 6/1985 | Keitaro | 91/1 X |
| 4,540,018 | 9/1985 | Dantlgraber | 137/625.65 |
| 4,550,631 | 11/1985 | Yamazaki et al. | 91/45 X |

FOREIGN PATENT DOCUMENTS

| | | | |
|---|---|---|---|
| 58602 | 1/1983 | Japan | 91/361 |
| 170901 | 10/1983 | Japan | 91/361 |
| 928093 | 9/1980 | U.S.S.R. | 91/361 |

OTHER PUBLICATIONS

Steuerungs und Regelungstechnik, Morlok et al., "Erweiterte Einsatzmoglichkeiten von Propertionalventilen", 1985, pp. 80–84, 87.
Servo und Proportionaltechnik, Edelmann, "Schnelle Proportionalventile Und ihre Anwendung", 1986, pp. 35–40.

Primary Examiner—John T. Kwon
Assistant Examiner—Thomas Denion
Attorney, Agent, or Firm—Harness, Dickey & Pierce

[57] ABSTRACT

The object of the invention is to improve the position and feed or advance regulation of a hydraulic drive which is controlled by a proportional valve. In a first compensation circuit the flow characteristic of the proportional valve is linearized to obtain very small feed rates and a high control amplification. In a second compensation circuit the positioning error of the drive arising from the necessary overlapping of the proportional valve is compensated.

10 Claims, 2 Drawing Sheets

CIRCUIT ARRANGEMENT FOR POSITION AND FEED CONTROL OF A HYDRAULIC CYLINDER

This is a continuation of U.S. patent application Ser. No. 131,906, filed Dec. 11, 1987, now abandoned.

BACKGROUND OF THE INVENTION

The invention relates to a circuit arrangement for position and advance or feed control of a hydraulic cylinder according to the preamble of claim 1.

A field of use of the invention is for example the drive of a machine tool carriage with a hydraulic cylinder. The feed of the carriage and the acceleration and speed are to be freely programmable, using for example an NC control for this purpose.

The NC control is supplied with the programmed command variable as desired value and as actual value with the controlled variable determined by a displacement pickup of the carriage or the drive and from these a control deviation is formed which is supplied to an amplifier which serves to drive a proportional valve which controls the fluid paths to and from the hydraulic cylinder. If instead of the usual servovalve a proportional valve is used a considerable saving of costs is achieved. However, the control accuracy achievable with a proportional valve is relatively low.

The invention is therefore based on the problem of further developing a circuit arrangement for forming a control for a hydraulic drive by means of a proportional valve in such a manner that even very small feeds or advance rates such as for example 20 mm/min can be produced, a high positioning accuracy of the drive is achieved and the highest possible load stiffness and dynamics of the control are achieved.

SUMMARY OF THE INVENTION

Said problem is solved with the features set forth in the characterizing clause of claim 1.

The invention is concerned on the one hand with improving the variable flow behavior of a proportional valve by providing the first compensation circuit which generates a digressive signal profile for driving the proportional valve and this compensates the progressive flow characteristic of the valve. As a result through the entire control range, i.e. for the entire adjustment stroke of the valve piston, the flow characteristic remains linear or approximately linear. Consequently, in the entire flow range the control amplification of the control circuit can be set to a maximum value.

The second compensation circuit is used to compensate the position error which results when the fluid path from the fluid source to the fluid drive is closed by the proportional valve before the control deviation is zero. In this case the carriage stops before the carriage position defined by the control deviation zero is reached. The cause of this behavior is that the proportional valve must have a positive covering or overlapping for the selected drive purpose, i.e. in the neutral position of the valve all the valve connections must be separate from each other.

By the combination of the two compensation circuits for compensating the flow characteristic and compensating the position caused by the valve overlapping it is possible with the invention to provide a very accurate position and feed control of a hydraulic drive by means of a proportional valve.

Advantageous further developments of the invention are set forth in the subsidiary claims.

BRIEF DESCRIPTION OF THE DRAWINGS

An example of embodiment of the invention will be explained in detail hereinafter with the aid of the drawings, wherein.

DETAILED DESCRIPTION OF THE PREFERRED EMBODIMENT

Figure 1:
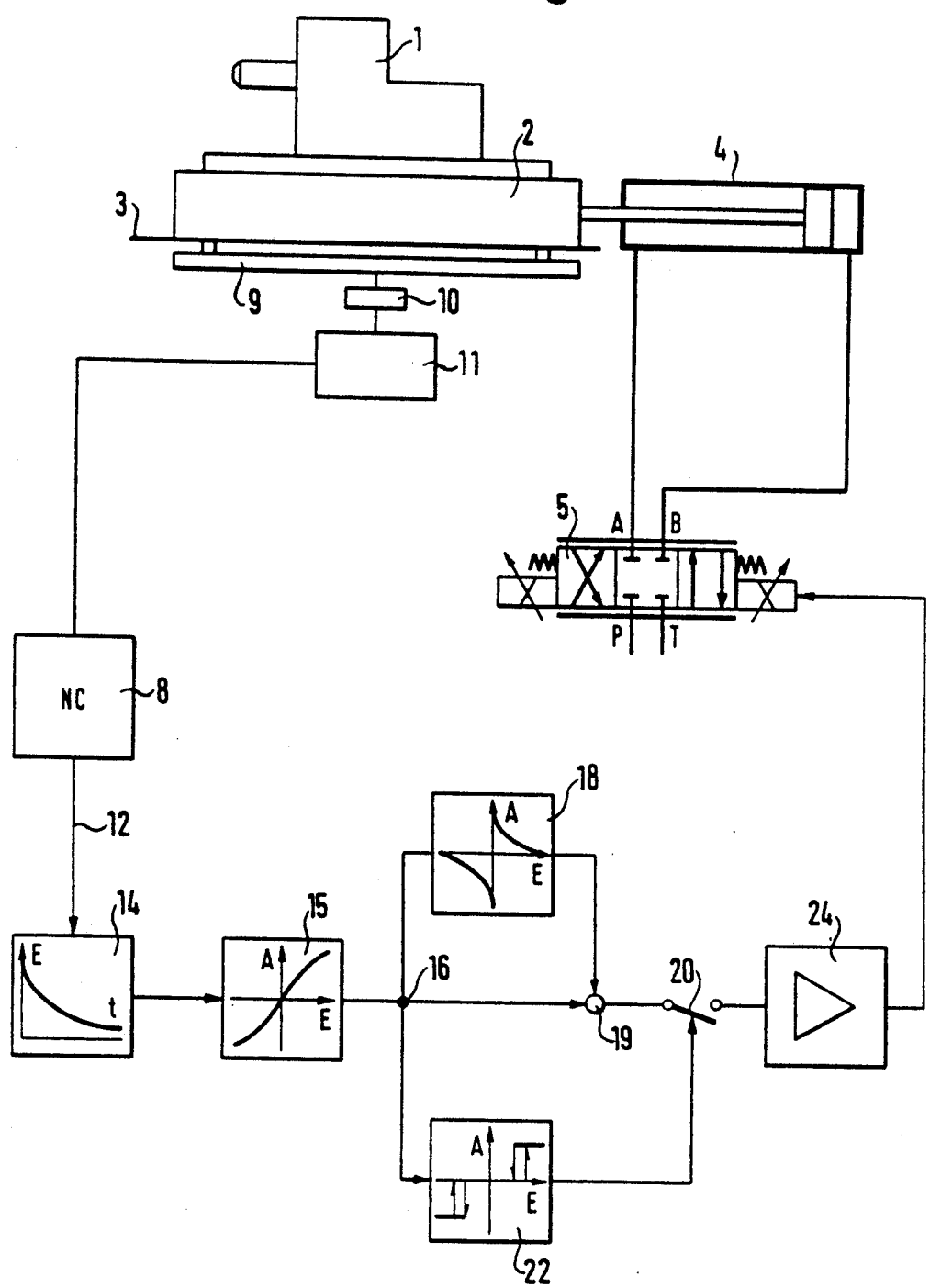
FIG. 1 is a schematic view of a circuit arrangement for position and feed control of a machine tool carriage.

In FIG. 1 a drill spindle 1 is secured to a machine tool carriage 2 which is displaceable on a slide guide 3 by means of a hydraulic cylinder 4. A proportional valve 5 serves to actuate the cylinder 4.

A commercially available NC control 8 is used for programming the positions to be taken up by the drill spindle 1 and the feed rates, including acceleration and retardation. The controlled variable, i.e. the carriage position, is determined by means of an incremental ruler 9 of a scanning head 10 and a transducer 11 and supplied to the NC control. The controlled variable is compared with the particular command variable called up by the program and a control deviation is formed which is present on the output line 12. In a conventional NC control the control deviation is generated in a proportional controller, the output voltage having a proportional variation and for example being regulated between ±10 volts.

Connected to the NC control 8 is firstly differentiating stage 14 which is connected on the output side to a first compensation circuit 15 which leads to a junction point 16 to which a second compensation circuit 18 and a summating stage 19 are connected. Via a switch 20 actuated by the output signal of an auxiliary circuit 22 the modified control deviation passes to an amplifier 24 whose output signal drives the proportional valve 5. The circuit arrangement consisting of the components 14 to 22 can preferably be united on a control card, the input voltage for the differentiating stage 14 likewise being ±10 volts so that a direct connection to the commercially available NC control 8 is possible. The control card can preferably be installed in the end amplifier 24.

The differentiating stage 14 consists of a conventional operational amplifier to the input of which the known series connection of voltage divider and capacitor is connected. The differentiation of the input signal increases the dynamics of the proportional valve 5 so that the piston of the proportional valve can thus reach its new desired position quicker.

In the first compensation circuit 15 the signal supplied is modified so that an almost linear flow characteristic of the proportional valve is achieved.

Figure 2:
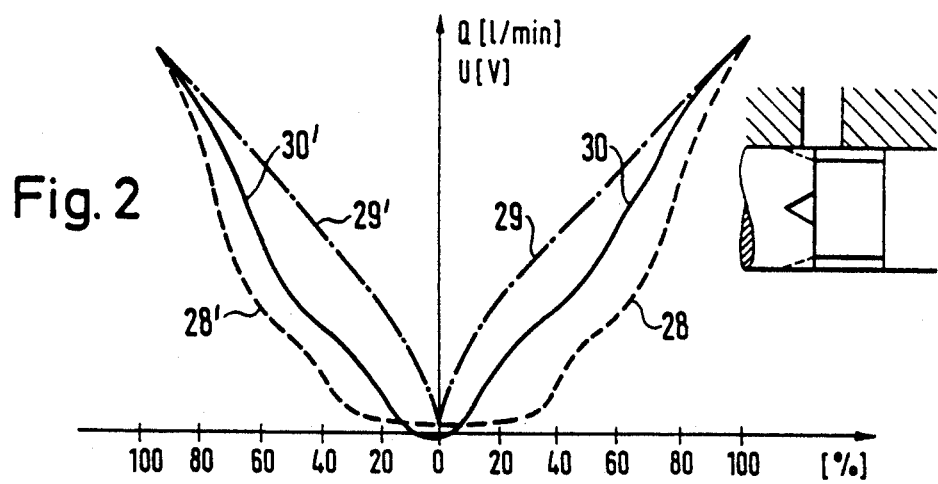
FIG. 2 illustrates the flow characteristic of the proportional valve.

FIG. 2 along the ordinate the flow Q of the proportional valve is plotted and along the abscissa the adjustment stroke of the piston of the proportional valve in percent. This quantity also corresponds to the control deviation X. The dashed line 28 shows a progressive flow behavior, i.e. at the deflection of the valve piston from the center position zero the flow increases only very slightly and then rises abruptly. This behavior is caused by the triangular fine control grooves on the valve piston. Such grooves are necessary to be able to adjust the necessary small feed rates at all. This means for the control circuit that in the lower flow range a low flow amplification is achieved and in the upper range a large flow amplification. The low amplification in the lower flow range manifests itself in small load stiffness.

By the compensation circuit 15 the progressive characteristic 28 of the proportional valve is compensated by a digressive profile of the output voltage of the compensation circuit 15. The voltage profile is shown in FIG. 2 as dot-dashed line 29. If the proportional valve is driven with this voltage an almost linear flow characteristic of the proportional valve is achieved which is represented in FIG. 2 as full line 30 and is the mean of the curves 28 and 29. Thus, the amplification in the lower flow range is raised electrically in such a manner that over the entire valve stroke from 0 to 100% a substantially constant flow amplification results. This correspondingly increases the load stiffness. By retaining the fine control grooves with progressive behavior extremely small feed rates for the drive can be achieved. The digressive characteristic 29 can be achieved by parallel connection of suitable Zener diodes in the feedback of the operational amplifier provided in the differentiating stage.

In the second compensation circuit 18 the error caused by the necessary overlapping of the proportional valve in the region of its center position is compensated. Due to the positive overlapping of the proportional valve, the fluid paths thereby being shut off before the exact center position of the valve piston is reached, the drive cylinder 4 comes to a standstill as soon as the valve piston has reached the positive overlapping but is not yet in the center position and the signal furnished by the proportional controller of the NC control 8 for the control monitoring has not yet reached zero. However, the center position of the valve piston is to correspond to the control deviation 0 volt. In other words, the carriage cannot reach its position corresponding to the control deviation zero because just beforehand due to the positive overlapping the valve closes and the carriage thus comes to a stop.

For this reason, just before reaching the overlapping a signal is generated by the compensation circuit 18 which is superimposed on the control deviation modified in the first compensation circuit 15 to stop the valve piston and keep the remaining or residual cross-section open for the flow of the fluid until the zero position of the carriage is reached, i.e. until the control deviation is zero.

Figure 3:
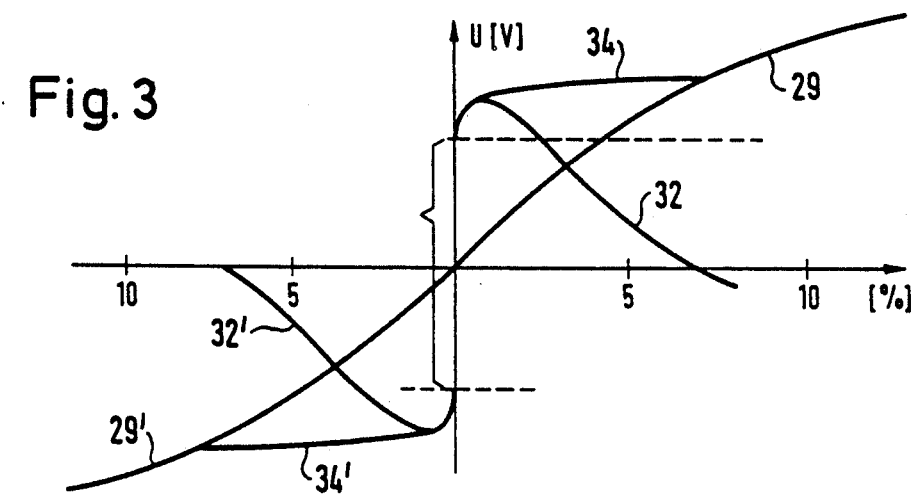
FIG. 3 shows the signal profile for driving the proportional valve in the region of the valve center position and FIG. 4 is an illustration similar to FIG. 3 with an artificially generated hysteresis.

The relationship is illustrated in FIG. 3, 29 again denotes the digressive output voltage which is furnished by the first compensation circuit 15 and of which in FIG. 3 only the portion in the small signal range, i.e. substantially in the fine control range of the valve, is illustrated. With a piston deflection of for example between 5 and 10% of the desired value the second compensation circuit 18 responds and furnishes a signal 32 which varies oppositely to the digressive characteristic 28. The signal 32 is added in the summation stage 19 to the signal 29 so that at the output of the summation stage the signal 34 is formed with which in the fine control range a remaining or residual cross-section is left open at the valve until the signal 29 and thus the control deviation reaches the zero value. The voltage 32 is now cut off and thus the spring-centered piston of the proportional valve brought into the center position. This step thus prevents the positive valve overlapping leading to incorrect positioning of the carriage. Via the amplitude of the signal voltage 32 the remaining cross-section of the valve and thus the remaining speed of the drive can be set. As a rule, due to production tolerances the positive overlappings for the valve piston position in the forward and rearward direction are different. It is then expedient to set the voltages 32 and 32' generated by the compensation circuit differently for the two movement directions and consequently for this purpose separate setting facilities are provided at the circuit 18.

Figure 4:
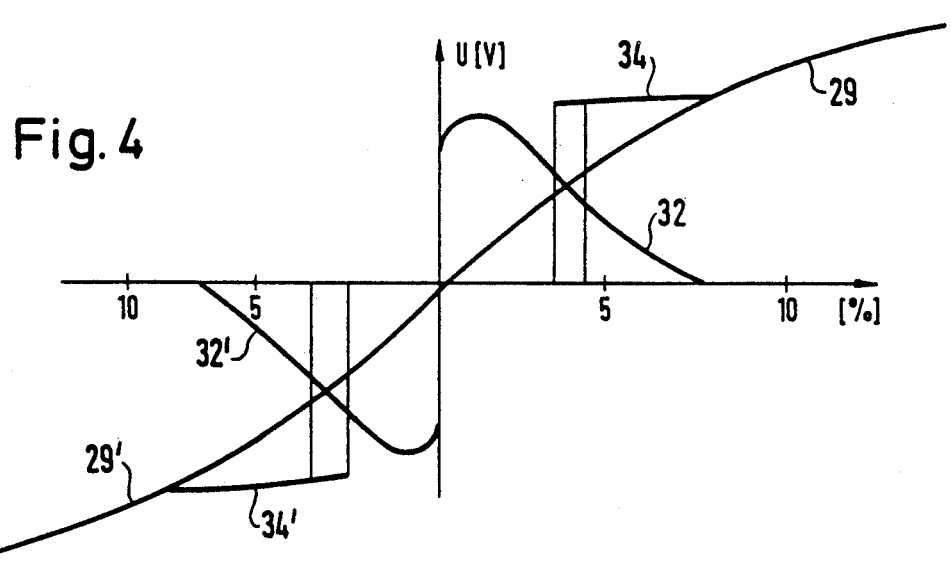

It is apparent from the illustration in FIG. 4 that the additional voltage 32 supplied by the second compensation circuit 18 can also be switched off before the instant at which the control deviation becomes zero. For this purpose the auxiliary circuit 22 is provided which responds to corresponding adjustable values of the output voltage 29 of the first compensation circuit 15 and on activation opens the switch 20 so that then the output signal of the summation stage 19 is disconnected and the piston of the proportional valve moves into the center position before the carriage 2 has reached the desired zero position.

The advantage is thus achieved that the valve closes just before reaching the desired position of the carriage and then the carriage itself moves automatically into the zero position. This depends on the natural frequency of the control circuit. If for instance the natural frequency is low, e.g. 20 Hertz, this is a soft control system in which the carriage can always slightly overshoot its desired position This would mean that by continuous overshooting continuous switching in the opposite direction would be necessary and the carriage would hunt about its position. This is avoided by the auxiliary circuit 22 with which the valve is shut off just before the desired position of the carriage is reached so that a slight overshooting of the carriage does not immediately lead to switching into the opposite direction. The auxiliary circuit 22 thus ensures an artificial hysteresis which is adjustable. If however the system has a high natural frequency, for example 100 Hertz, the auxiliary circuit 22 is not necessary.

I claim:

1. A control circuit which is part of an arrangement for position and feed control of a hydraulic cylinder, the arrangement having a proportional valve with an overlap in its neutral position in which its passages close before the valve is fully in the neutral position for controlling fluid paths between the cylinder and a fluid source and a tank, the control circuit comprising:
    means for generating a control signal from a deviation between a common variable and a controlled variable,
    a first compensation circuit for generating a position compensation signal when said proportion valve approaches the overlapping position,
    means for summing said position compensation signal and said control signal, and
    amplifier means for communicating an operating signal to said proportional valve in response to a summation of said position compensation signal and control signal, the operating signal directing the proportional valve to retain a remaining cross-section of said proportional valve opened before reaching its overlapping condition and until the control deviation is zero.

2. Control circuit according to claim 1, characterized in that the first compensation circuit can be tuned to provide different signals for the position of said proportional valve on either side of its neutral position.

3. Control circuit according to claim 1 further including a second compensation circuit for providing a non linear compensation signal to said proportional valve for effecting linear operation in the entire range the stroke of said proportional valve.

4. Control circuit according to claim 3, characterized in that the nonlinear compensation signal is added to the position compensation signal and the control signal in the summing means and a summation of the nonlinear compensation, position compensation, and control signals is communicated to the amplifier.

5. Control circuit according to claim 3, characterized in that the second compensation circuit outputs a digressive signal profile.

6. Control circuit according to claim 1, characterized in that the means for generating the control signal is a differentiating stage connected to the first compensation circuit.

7. Control circuit according to claim 3 characterized in that the second compensation circuit is made up of zener diodes which are connected into the feedback of an operational amplifier serving a differentiating stage.

8. Control circuit according to claim 3 characterized in that the control circuit further comprises an auxiliary circuit for affecting closure of the proportional valve before a desired position of the cylinder is reached.

9. Control circuit according to claim 8, characterized in that he auxiliary circuit is connected to the output of the second compensation circuit and opens a switch between the summing means and the amplifier connecting the summing means into said amplifier on reaching a predetermined control deviation from zero.

10. Control circuit according to claim 1, characterized in that the control circuit further comprises a programmable NC control with a proportional voltage output.

* * * * *